United States Patent [19]
Onishi

[11] Patent Number: 5,981,682
[45] Date of Patent: Nov. 9, 1999

[54] SILICON BONDING AGENT FOR OPTICAL MEMORY ELEMENT, OPTICAL MEMORY ELEMENT, AND METHOD FOR MANUFACTURING OPTICAL MEMORY ELEMENT

[75] Inventor: Masayuki Onishi, Ichihara, Japan

[73] Assignee: Dow Corning Toray Silicone Co., Ltd., Tokyo, Japan

[21] Appl. No.: 08/878,723

[22] Filed: Jun. 19, 1997

[30]     Foreign Application Priority Data

Jun. 25, 1996  [JP]  Japan ................................. 8-183976

[51] Int. Cl.⁶ ........................... C08G 77/12; C08G 77/14
[52] U.S. Cl. ............................... 528/31; 528/15; 528/16; 528/17; 528/32; 524/847; 524/862
[58] Field of Search ........................ 528/15, 16, 17, 528/31, 32; 524/847, 862

[56]             References Cited

U.S. PATENT DOCUMENTS

| | | | |
|---|---|---|---|
| 4,754,013 | 6/1988 | Antonen | 528/15 |
| 5,068,301 | 11/1991 | Okamura et al. | 528/15 |
| 5,304,621 | 4/1994 | Staiger et al. | 528/12 |
| 5,462,988 | 10/1995 | Doi et al. | 524/501 |
| 5,504,174 | 4/1996 | Onishi | 528/15 |
| 5,684,110 | 11/1997 | Kawamura | 528/15 |

FOREIGN PATENT DOCUMENTS

| | | |
|---|---|---|
| 2025884 | 10/1995 | Canada . |
| 0 493 791 | 7/1992 | European Pat. Off. . |
| 61-267947 | 11/1986 | Japan . |
| 1-276452 | 11/1989 | Japan . |

*Primary Examiner*—David W. Wu
*Assistant Examiner*—Caixia Lu-Rutt
*Attorney, Agent, or Firm*—Paula J. Lagattuta; Larry A. Milco; Catherine U. Brown

[57]             ABSTRACT

A silicone composition curable to a silicone bonding agent that is suitable for use in manufacturing an optical memory element comprises:

(A) 100 parts by weight of an organopolysiloxane having an average of at least two silicon-bonded alkoxy groups per molecule and an average of at least two silicon-bonded alkenyl groups per molecule, wherein the alkoxy groups and the alkenyl groups are in the same molecule;

(B) an organohydrogenpolysiloxane having an average of at least two silicon-bonded hydrogen atoms per molecule, wherein the molar ratio of silicon-bonded hydrogen atoms in component (B) to silicon-bonded alkenyl groups in component (A) is from 0.3:1 to 20:1;

(C) 0.01 to 20 parts by weight of a metal condensation reaction catalyst wherein the metal of said metal condensation reaction catalyst is selected from the group consisting of titanium, zirconium and aluminum; and (D) a catalytic amount of a hydrosilylation reaction catalyst. The composition is cured by an addition reaction and a condensation reaction.

8 Claims, 1 Drawing Sheet

SILICON BONDING AGENT FOR OPTICAL MEMORY ELEMENT, OPTICAL MEMORY ELEMENT, AND METHOD FOR MANUFACTURING OPTICAL MEMORY ELEMENT

BACKGROUND OF THE INVENTION

1. Field of the Invention

The present invention concerns a silicone type bonding agent for an optical memory element, an optical memory element, and a method for manufacturing an optical memory element. More specifically, the present invention concerns (a) a silicone type bonding agent for an optical memory element which can be quickly cured by an addition reaction and a condensation reaction, and which makes it possible to bond together in a favorable manner a substrate which has a recording layer on one side and a substrate which may or may not have a recording layer on one side, (b) an optical memory element which is formed by bonding such substrates together in a favorable manner, and (c) a method for the efficient manufacture of such an optical memory element.

2. Description of Related Art

Optical memory elements, such as optical cards or optical disks (video disks or compact disks, etc.), which allow the optical recording, erasing and playback of information, are subject to warping. Warping of the optical memory element is caused by changes in temperature and humidity, etc., and can be alleviated by bonding together two substrates at least one of which has a recording layer on one side. Bonding agents which are used to bond such substrates together include, for example, silicone type optical memory element bonding agents containing a silicone composition which is cured by a two-liquid type condensation reaction (see Japanese Patent Application Kokai No. 61-267947), silicone type optical memory element bonding agents containing a silicone composition which is cured by a de-alcohol type condensation reaction (see Japanese Patent Application Kokai No. 1-276452), and silicone type optical memory element bonding agents containing a silicone composition which is cured by a condensation reaction or an addition reaction (see Japanese Patent Application Kokai No. 3-113744).

Silicone compositions which are cured by a condensation reaction are advantageous in that the curing of such compositions tends to be free of any cure inhibition, so that the abovementioned substrates can be bonded in a favorable manner. However, since curing proceeds gradually from portions of the composition that are in contact with moisture in the air, such compositions suffer from a serious drawback. Such composition must be allowed to stand for a long period of time in order to achieve sufficient curing of the interior portions of the composition sandwiched between the abovementioned substrates such that a fastening force which is sufficient to allow movement of the optical memory element or treatment of the optical memory element in subsequent processes is obtained. Accordingly, continuous bonding of the abovementioned substrates is impossible.

In the case of silicone compositions which are cured by a two-liquid type condensation reaction, curing also proceeds from the interior portions of the silicone composition sandwiched between the abovementioned substrates. Accordingly, problems such as those described above are not encountered to any great extent. However, since curing by the abovementioned condensation reaction proceeds gradually, the optical memory element must be allowed to stand for a long period of time in order to obtain a fastening strength which is sufficient to allow movement or treatment in subsequent processes. Furthermore, in the case of silicone compositions of this type, the adhesion of the composition to the abovementioned substrates tends to be inferior to that seen in the case of single-liquid type silicone compositions, so that it is necessary to subject the abovementioned substrates to a primer treatment beforehand. Accordingly, continuous bonding of the abovementioned substrates is impossible.

In the case of silicone compositions which are cured by an addition reaction, curing also proceeds from the interior portions of the composition sandwiched between the abovementioned substrates, and curing proceeds more rapidly than in the case of silicone compositions cured by a condensation reaction. Accordingly, the time required in order to obtain a fastening strength which is sufficient to allow movement of the optical memory element or treatment of said element in subsequent processes is short, and such compositions are also advantageous in that no by-products are formed during curing. However, curing tends to be inhibited by nitrogen-containing compounds, sulfur-containing compounds, phosphorus-containing compounds, tin-containing compounds and solder flux, etc. Furthermore, the adhesion of compositions of this type to the abovementioned substrates tends to be inferior to that of compositions cured by a condensation reaction, so that it is necessary to subject the substrates to a cleaning treatment or a primer treatment beforehand. Accordingly, continuous bonding of the abovementioned substrates is impossible.

It is an object of the present invention to provide (a) a silicone bonding agent for an optical memory element which can be quickly cured by an addition reaction and a condensation reaction, and which makes it possible to bond together in a favorable manner a substrate which has a recording layer on one side and a substrate which may or may not have a recording layer on one side, (b) an optical memory element which is formed by bonding such substrates together in a favorable manner, and (c) a method for the efficient manufacture of such an optical memory element.

SUMMARY OF THE INVENTION

The silicone type bonding agent for an optical memory element provided by the present invention is characterized by the fact that (a) said agent is used to bond together a substrate which has a recording layer on one side and a substrate which may or may not have a recording layer on one side, and (b) said agent comprises a silicone composition that is cured by an addition reaction and a condensation reaction.

Furthermore, the optical memory element of the present invention is characterized by the fact that said element is formed by bonding together a substrate which has a recording layer on one side and a substrate which may or may not have a recording layer on one side via a silicone bonding agent for an optical memory element which comprises of a silicone composition that is cured by an addition reaction and a condensation reaction.

Furthermore, the method of the present invention for manufacturing an optical memory element is characterized by the fact that a substrate which has a recording layer on one side and a substrate which may or may not have a recording layer on one side are bonded together via a silicone type bonding agent for an optical memory element which comprises a silicone composition that is cured by an addition reaction and a condensation reaction.

DETAILED DESCRIPTION OF PREFERRED EMBODIMENTS OF THE INVENTION

Figure 1:
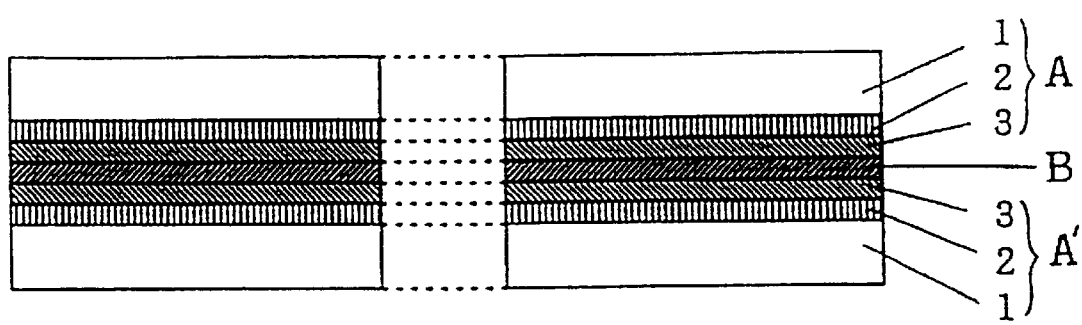

First, the silicone bonding agent for an optical memory element provided by the present invention will be described in detail.

The silicone type bonding agent for an optical memory element provided by the present invention is used to bond together a substrate which has a recording layer on one side and a substrate which may or may not have a recording layer on one side. In cases where the optical memory element involved is an optical disk, these substrates are disk substrates. The silicone bonding agent for an optical memory element provided by the present invention comprises a silicone composition which is cured by an addition reaction and a condensation reaction. There are no particular restrictions on this composition; however, from the standpoints of relatively unimpaired curing, good adhesion and a rapid curing rate, it is desirable that this silicone composition comprise the following:

(A) 100 parts by weight of an organopolysiloxane having an average of at least two silicon-bonded alkoxy groups and two silicon-bonded alkenyl groups per molecule, in the same or different molecules;

(B) an organopolysiloxane having an average of at least two silicon-bonded hydrogen atoms per molecule, wherein the amount of said organopolysiloxane added to the composition being such that the molar ratio of the silicon-bonded hydrogen atoms in component (B) to the silicon-bonded alkenyl groups in component (A) is from 0.3 to 20;

(C) 0.01 to 20 parts by weight of at least one type of metal condensation reaction catalyst selected from the group consisting of titanium, zirconium and aluminum catalysts; and (D) a catalytic amount of a hydrosilylation reaction catalyst.

Component (A) is the main ingredient of the silicone bonding agent of the present invention. This component is an organopolysiloxane having an average of at least two alkoxy groups and an average of at least two silicon-bonded alkenyl groups per molecule, in the same or different molecules, or of a mixture of such organopolysiloxanes. Examples of this component (A) include organopolysiloxanes which have at least two silicon-bonded alkoxy groups and at least two silicon-bonded alkenyl groups per molecule in the same molecule, such as vinyldimethoxysiloxy-terminated dimethylpolysiloxanes; trimethoxysiloxy-terminated dimethylsiloxane-methylvinylsiloxane copolymers; and methyldimethoxysiloxy-terminated dimethylsiloxane-methylvinylsiloxane copolymers etc., and mixtures of organopolysiloxanes which have at least two silicon-bonded alkoxy groups and two silicon-bonded alkenyl groups per molecule in different molecules, such as mixtures of (a) an organopolysiloxane which has at least an average of two silicon-bonded alkoxy groups per molecule, and (b) an organopolysiloxane which has an average of at least two silicon-bonded alkenyl groups per molecule, etc. In particular, mixtures of (a) an alkoxyl-substituted organopolysiloxane which has an average of at least two silicon-bonded alkoxy groups per molecule, and (b) an alkenyl-substituted organopolysiloxane which has an average of at least two silicon-bonded alkenyl groups per molecule, are especially desirable in that the respective numbers of silicon-bonded alkoxy groups and silicon-bonded alkenyl groups in component (A) can be finely adjusted, and in that the silicone bonding agent memory element that is obtained has better adhesive properties.

It is necessary that the organopolysiloxane of component (a) have at least an average of two silicon-bonded alkoxy groups per molecule. If the number of silicon-bonded alkoxy groups is less than two per molecule, the resulting silicone bonding agent may show insufficient curing or impaired curing, or the adhesive properties of said bonding agent may be inferior. The molecular structure of this component (a) may be a linear structure, a linear structure with some branching, a branched structure, a cyclic structure or a network structure. A linear structure is especially desirable. Examples of silicon-bonded alkoxy groups in component (a) include methoxy groups, ethoxy groups, propoxy groups and butoxy groups. Methoxy groups are especially desirable. The bonding positions of these alkoxy groups may be at the ends of the molecular chains and/or on side chains of the molecular chains. From the standpoint of favorable reactivity, bonding positions at the ends of the molecular chains are especially desirable. Furthermore, these alkoxy groups may be bonded directly to silicon atoms in the principal chains, or may be bonded to silicon atoms which are bonded to principal-chain silicon atoms via alkylene groups. Groups other than alkoxy groups which may be bonded to silicon atoms in this component (a) include substituted or unsubstituted monovalent hydrocarbon groups. Preferred monovalent hydrocarbon groups include alkyl groups, such as methyl, ethyl, propyl, butyl, pentyl, hexyl, heptyl, octyl, nonyl, decyl or octadecyl; cycloalkyl groups, such as cyclopentyl and cyclohexyl; aryl groups, such as phenyl, tolyl, xylyl and naphthyl groups; aralkyl groups such as benzyl, phenethyl and phenylpropyl; and halogenated alkyl groups, such as 3-chloropropyl and 3,3,3-trifluoropropyl. Methyl and phenyl are particularly preferred. Furthermore, from the standpoint of obtaining better adhesive properties in the resulting silicone bonding agent, it is desirable that the silicon-bonded alkoxy groups in component (a) be methoxy groups, and that the groups other than said alkoxy groups be methyl or phenyl. It is desirable that the viscosity of this component (a) at 25° C. be from 20 to 1,000,000 centipoise (mPa.s.). A viscosity of 100 to 500,000 centipoise (mPa.s.) is especially desirable. If the viscosity is less than 20 centipoise (mPa.s.), the physical characteristics of the cured product that is obtained tend to deteriorate. If the viscosity is greater than 1,000,000 centipoise (mPa.s.), the handling and working characteristics of the resulting bonding agent tend to deteriorate. In preferred embodiments, component (a) is an alkoxy-substituted organopolysiloxane having the following general formula (1):

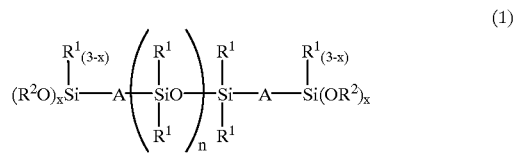

(1)

In the above formula, $R^1$ is individually selected from the group consisting of substituted or unsubstituted monovalent hydrocarbon groups. Examples of such groups include the monovalent hydrocarbon groups described above. Methyl and phenyl are especially desirable. $R^2$ in the above formula indicates alkyl groups. Examples of such alkyl groups include methyl, ethyl, propyl and butyl. Methyl is particularly preferred. A in the above formula is individually selected from the group consisting of oxygen atoms and alkylene groups. Examples of preferred alkylene groups include ethylene, propylene and butylene. Ethylene or propylene are particularly preferred. In the above formula, x is 2 or 3, with 3 being preferred. Moreover, from the standpoint of obtaining better adhesive properties in the resulting silicone bonding agent, it is desirable that $R^1$ in the above formula is selected from the group consisting of phenyl, $R^2$ is methyl, A is an oxygen atom, and x be 3. Furthermore n in the above formula is a positive number; from the standpoint of obtaining favorable handling and working characteristics in the resulting silicone type bonding agent, and favorable physical characteristics in the resulting cured product, it is desirable that n be a positive number selected such that the viscosity of the abovementioned organopolysiloxane at 25° C. is from 20 to 1,000,000 centipoise (mPa.s.). In preferred embodiments, n is selected such that the viscosity of component (A) is 100 to 500,000 centipoise (mPa.s.). Examples of compounds which can be used as component (a) include trimethoxysiloxy-terminated dimethylpolysiloxanes, methyldimethoxysiloxy-terminated dimethylpolysiloxanes, trimethoxysilylethyldimethylsiloxy-terminated dimethylpolysiloxanes, organopolysiloxanes formed by substituting some of the methyl groups of the abovementioned dimethylpolysiloxanes with alkyl groups other than methyl groups, phenyl groups or 3,3,3-trifluoropropyl groups, and mixtures consisting of two or more of these organopolysiloxanes.

It is necessary that the alkenyl-substituted organopolysiloxane of component (b) have an average of at least two silicon-bonded alkenyl groups per molecule. If the number of silicon-bonded alkenyl groups is less than two per molecule, the resulting silicone bonding agent may show insufficient curing. The molecular structure of this component (b) may be a linear structure, a linear structure with some branching, a branched structure, a cyclic structure or a network structure. Examples of silicon-bonded alkenyl groups of (b) include vinyl, allyl, butenyl, pentenyl and hexenyl. Vinyl groups are particularly preferred. The bonding positions of these alkenyl groups may be at the ends of the molecular chains and/or on side chains of the molecular chains. From the standpoint of favorable reactivity, bonding positions at the ends of the molecular chains are especially desirable. Groups other than alkenyl groups which may be bonded to silicon atoms in component (b) include substituted or unsubstituted monovalent hydrocarbon groups. Preferred monovalent hydrocarbon groups include alkyl groups, such as methyl, ethyl, propyl, butyl, pentyl, hexyl, heptyl, octyl, nonyl, decyl or octadecyl; cycloalkyl groups, such as cyclopentyl and cyclohexyl; aryl groups, such as phenyl, tolyl, xylyl and naphthyl; aralkyl groups, such as benzyl, phenethyl and phenylpropyl, and halogenated alkyl groups, such as 3-chloropropyl and 3,3,3-trifluoropropyl. Methyl and phenyl are particularly preferred. It is desirable that the viscosity of component (b) at 25° C. be from 20 to 1,000,000 centipoise (mPa.s.). A viscosity of 100 to 500,000 centipoise (mPa.s.) is particularly preferred. If the viscosity is less than the 20 centipoise (mPa.s.), the physical characteristics of the cured product that is obtained tend to deteriorate. If the viscosity is greater than 1,000,000 centipoise (mPa.s.), the handling and working characteristics of the resulting silicone bonding agent tend to deteriorate. Examples of compounds which can be used as the abovementioned component (b) include dimethylvinylsiloxy-terminated dimethylpolysiloxanes, dimethylvinylsiloxy-terminated dimethylsiloxane-methylvinylsiloxane copolymers, trimethylsiloxy-terminated methylvinylpolysiloxanes, trimethylsiloxy-terminated dimethylsiloxane-methylvinylsiloxane copolymers, organopolysiloxanes consisting of $(CH_2=CH)(CH_3)_2SiO_{1/2}$ units and $SiO_{4/2}$ units, organopolysiloxanes consisting of $(CH_3)_3SiO_{1/2}$ units, $(CH_2=CH)(CH_3)_2SiO_{1/2}$ units and $SiO_{4/2}$ units, organopolysiloxanes consisting of $(CH_3)_3SiO_{1/2}$ units, $(CH_2=CH)(CH_3)_2SiO_{1/2}$ units, $(CH_3)_2SiO_{2/2}$ units and $SiO_{4/2}$ units, organopolysiloxanes formed by substituting some of the methyl groups of the abovementioned dimethylpolysiloxanes by alkyl groups (other than methyl groups), phenyl groups or 3,3,3-trifluoropropyl groups, and mixtures consisting of two or more of these organopolysiloxanes.

In regard to the mixture ratio of component (a) and component (b) in component (A), it is desirable that the amount of component (a) that is added constitute 5 to 95 wt % of component (A), with component (b) constituting the remainder of component (A). In particular, a mixture ratio which is such that component (a) constitutes 20 to 80 wt % of component (A), while component (b) constitutes the remainder of component (A), is especially desirable. The reason for this is that if the amount of component (a) added to component (A) is less than the lower limit of the abovementioned range, the resulting silicone type bonding agent will show impaired curing, and will tend to have inferior adhesive properties. On the other hand, if the amount of component (a) that is added exceeds the upper limit of the abovementioned range, the curing of the resulting silicone type bonding agent tends to be slow.

The organohydrogenpolysiloxane of component (B) is a component which is used to cure the aforementioned silicone bonding agent by means of an addition reaction between the alkenyl groups bonded to silicon atoms in component (A) and the hydrogen atoms bonded to silicon atoms in component (B). It is necessary that this component (3) have an average of at least two silicon-bonded hydrogen atoms per molecule. If the number of silicon-bonded hydrogen atoms in this component is less than two per molecule, the resulting silicone bonding agent will not be sufficiently cured. The molecular structure of this component (B) may be a linear structure, a linear structure with some branching, a branched structure, a cyclic structure or a network structure. The bonding positions of the silicon-bonded hydrogen atoms may be at the ends of the molecular chains and/or on side chains of the molecular chains. Furthermore, groups other than hydrogen atoms which may be bonded to silicon atoms in this component (B) include substituted or unsubstituted monovalent hydrocarbon groups. Preferred monovalent hydrocarbon groups include alkyl groups, such as methyl, ethyl, propyl, butyl, pentyl, hexyl, heptyl, octyl, nonyl, decyl and octadecyl; cycloalkyl groups, such as cyclopentyl and cyclohexyl; aryl groups, such as phenyl, tolyl, xylyl and naphthyl; aralkyl, such as benzyl, phenethyl and phenylpropyl; and halogenated alkyl groups, such as 3-chloropropyl and 3,3,3-trifluoropropyl; etc. Methyl and phenyl groups are particularly preferred from the standpoint of obtaining better adhesive properties in the resulting silicone bonding agent. It is desirable that the viscosity of this component (B) at 25° C. be from to 10,000 centipoise (mPa.s.). If the viscosity is than 1 centipoise (mPa.s.), the physical characteristics of the cured product that is obtained tend to deteriorate. If the viscosity is greater than 10,000 centipoise (mPa.s.), the handling and working characteristics of the resulting silicone bonding agent tend to deteriorate. Examples of compounds which can be used as the abovementioned component (B) include trimethylsiloxy-terminated methylhydrogenpolysiloxanes, Trimethylsiloxy-terminated dimethylsiloxane-methylhydrogensiloxane copolymers, dimethylhydrogensiloxy-terminated dimethylpolysiloxanes, dimethylhydrogensiloxy-terminated dimethylsiloxane-methylhydrogensiloxane copolymers, organopolysiloxanes consisting of $(CH_3)_2HSiO_{1/2}$ units and $SiO_{4/2}$ units, organopolysiloxanes consisting of $(CH_3)_3SiO_{1/2}$ units, $(CH_3)_2HSiO_{1/2}$ units and $SiO_{4/2}$ units, organopolysiloxanes consisting of $(CH_3)3SiO_{1/2}$ units, $(CH_3)_2HSiO_{1/2}$ units, $(CH_3)_2SiO_{2/2}$ units and $SiO_4/_2$ units, organopolysiloxanes formed by substituting some of the methyl groups of the abovementioned dimethylpolysiloxanes with alkyl groups (other than methyl groups), phenyl groups or 3,3,3-trifluoropropyl groups, and mixtures consisting of two or more of these organopolysiloxanes.

The amount of component (B) that is added to the composition is an amount which is such that the molar ratio of the silicon-bonded hydrogen atoms in component (B) to silicon-bonded alkenyl groups in component (A) is from 0.3 to 20. In preferred embodiments, the molar ratio is from 0.5 to 10. If the molar ratio is less than 0.3:1 the resulting silicone bonding agent tends to be insufficient cured. If the molar ratio is greater than 20:1, the physical properties of the resulting cured product tend to deteriorate. Component (C) consists of at least one metal condensation reaction catalyst wherein the metal of the metal condensation reaction catalyst is the group consisting of titanium, zirconium and aluminum. This component is a catalyst which is used to promote the condensation reaction of the silicon-bonded alkoxy groups in component (A). Examples of compounds which can be used as component (C) include titanium type condensation reaction catalysts, such as organo-titanic acid esters (such as tetrabutyl titanate and tetraisopropyl titanate), and organo-titanium chelate compounds (such as diisopropoxybis(acetylacetate)titanium and diisopropoxybis (ethylacetoacetate)titanium); zirconium type condensation reaction catalysts, such as organo-zirconium esters (such as zirconium tetrapropylate and zirconium tetrabutyrate), and organo-zirconium chelate compounds (such as zirconium diacetate, zirconium tetra(acetylacetonate), tributoxyzirconium acetylacetonate, dibutoxyzirconium bis (acetylacetonate), tributoxyzirconium acetoacetate and dibutoxyzirconium acetylacetonate (ethylacetoacetate)); aluminum type condensation reaction catalysts, such as organo-aluminum esters (such as aluminum triethylate, aluminum triisopropylate, aluminum tri(sec-butyate) and mono (sec-butoxy)aluminum diisopropylate), and organo-aluminum chelate compounds (such as diisopropoxyaluminum (ethylacetoacetate), aluminum tris (ethylacetoacetate), aluminum bis(ethylacetoacetato) monoacetylacetonate and aluminum tris (acetylacetonate)); and mixtures consisting of two or more of these metal condensation reaction catalysts.

The amount of component (C) that is added is 0.01 to 20 parts by weight (preferably 0.1 to 5 parts by weight) per 100 parts by weight of component (A). If the amount of component (C) is less than 0.01 parts, the resulting silicone bonding agent tends to show insufficient curing or impaired curing, and the adhesive properties of said bonding agent tend to be inferior. If the amount added exceeds 20 parts, the storage stability of the resulting silicone bonding agent tends to deteriorate.

The hydrosilylation reaction catalyst of component (D) is a catalyst which is used to promote an addition reaction between the silicon-bonded alkenyl groups in component (A) and the silicon-bonded hydrogen atoms in component (B). Examples of catalysts which can be used as this component (D) include platinum type catalysts such as platinum black, platinum-supporting powdered active carbon, platinum-supporting powdered silica, chloroplatinic acid, alcohol solutions of chloroplatinic acid, olefin complexes of platinum and alkenylsiloxane complexes of platinum; rhodium type catalysts, palladium type catalysts, fine particles of thermoplastic resins containing these catalysts, and mixtures of two or more of these hydrosilylation reaction catalysts. In particular, platinum type catalysts and fine particles of thermoplastic resins containing such platinum type catalysts are especially desirable from the standpoint of obtaining favorable curability in the resulting silicone bonding agent. From the standpoint of obtaining an efficient catalytic action, it is desirable that the abovementioned fine thermoplastic resin particles consist of a silicone resin, polycarbonate resin, acrylic resin, nylon resin or polyester resin with a softening point of 5 to 200° C., and that said particles have a particle size of 0.01 to 10 microns.

The amount of component (D) that is added to the composition is a catalytic amount. In cases where a platinum type catalyst is used as component D, it is desirable that the amount of catalyst used be such that the quantity of platinum atoms in component (D) is from 0.01 to 1,000 ppm (in weight units) relative to the resulting silicone type bonding agent. An amount which is such that the abovementioned quantity of platinum atoms is from 0.5 to 500 ppm is especially desirable. In cases where a platinum type catalyst is used as component (D), if the amount of component (D) that is added is less than 0.01 ppm, the resulting silicone bonding agent tends to show insufficient curing. If the amount added exceeds 1,000 ppm, there is no great effect on curability, and the external appearance of the cured product tends to deteriorate.

A silicone composition which is suitable for use in the silicone type optical memory element bonding agent of the present invention can be prepared by uniformly mixing the abovementioned components (A) through (D). Furthermore, alkoxysilanes or partially hydrolyzed condensates of alkoxysilanes, inorganic fillers, addition reaction inhibiting agents, non-reactive organopolysiloxanes, organic solvents, flame retarding agents, heat resistance enhancing agents, plasticizers, thixotropic agents, adhesion promoting agents and/or anti-mildew agents, etc., may also be added to the abovementioned composition as long as the addition of such agents does not interfere with the object of the present invention.

From the standpoints of ease of mixing with the silicone bonding agent of the present invention and improvement of adhesion and storage stability, it is desirable that the abovementioned alkoxysilanes be alkoxysilanes expressed by the following general formula (2):

$$R^3{}_a Si(OR^4)_{(4-a)} \qquad (2)$$

In the above formula, $R^3$ indicates at least one type of group selected from a group consisting of monovalent hydrocarbon groups, epoxy-functional organic groups and acrylic-functional organic groups. Examples of monovalent hydrocarbon groups which can be used include substituted or unsubstituted monovalent hydrocarbon groups, e. g., alkyl groups, such as methyl, ethyl, propyl, butyl, pentyl, hexyl, heptyl, octyl, nonyl, decyl and octadecyl; cycloalkyl groups, such as cyclopentyl and cyclohexyl; alkenyl groups, such as vinyl and allyl; aryl groups, such as phenyl, tolyl, xylyl and naphthyl; aralkyl groups, such as benzyl, phenethyl and phenylpropyl; and halogenated alkyl groups, such as 3-chloropropyl and 3,3,3-trifluoropropyl. Examples of the abovementioned epoxy-functional organic groups which can be used include oxiranylalkyl groups, such as 4-oxiranylbutyl or 8-oxiranyloctyl; glycidoxyalkyl groups, such as 3-glycidoxypropyl and 4-glycidoxybutyl; and 2-(3, 4-epoxycyclohexyl)vinyl groups. Furthermore, examples of the abovementioned acrylic-functional organic groups include 3-acryloxypropyl groups, 3-methacryloxypropyl and 4-methacryloxybutyl. Furthermore, in the above formula, $R^4$ indicates an alkyl group or an alkoxyalkyl group. Examples of groups which can be used include alkyl groups, such as methyl, ethyl, propyl, butyl, pentyl, hexyl, heptyl, octyl, nonyl, decyl and octadecyl; and alkoxyalkyl groups, such as methoxyethyl, ethoxyethyl, methoxypropyl and methoxybutyl. Methyl is especially desirable. Furthermore, in the above formula, a is 0, 1 or 2, and is preferably 1. From the standpoint of obtaining improved adhesion and storage stability in the resulting silicone bonding agent, an alkoxysilane in which $R^3$ in the above formula is a methyl group, $R^4$ is a methyl group and a is 1, i. e., methyltrimethoxysilane, is especially desirable. Examples of such alkoxysilanes (or partially hydrolyzed condensates of the same) include alkoxysilanes such as tetramethoxysilane, tetraethoxy-silane, methylcellosolve ortho-silicate, methyltrimethoxysilane, methyltriethoxysilane, ethyltrimethoxysilane, vinyltrimethoxy-silane, phenyltrimethoxysilane, methyltrimethoxyethoxysilane, dimethyldimethoxysilane and diphenyldimethoxysilane; epoxy-functional alkoxysilanes such as 4-oxiranylbutyltrimethoxysilane, 8-oxiranyloctyltrimethoxysilane, 3-glycidoxypropyltrimethoxysilane and 2-(3,4-epoxycyclohexyl)ethyltrimethoxysilane; and acrylic-functional alkoxysilanes such as 3-methacryloxypropyl trimethoxysilane and 4-methacryloxybutyltrimethoxysilane; as well as partially hydrolyzed condensates of such alkoxysilanes and mixtures of two or more different types of such alkoxysilanes or partially hydrolyzed condensates of alkoxysilanes. From the standpoint of obtaining improved adhesion and storage stability in the silicone bonding agent of the present invention, it is desirable that the amount of such alkoxysilanes (or partially hydrolyzed condensates of the same) added to the composition be in the range of 0.1 to 20 parts by weight per 100 parts by weight of component (A).

Furthermore, the abovementioned addition reaction inhibiting agents are agents that are used in order to adjust the curing time of the silicone bonding agent of the present invention. Examples of such agents include acetylene type compounds such as 3-methyl-1-butyn-3-ol, 3,5-dimethyl-1-hexyn-3-ol and 3-phenyl-2-butyn-3-ol; "enyne" compounds, such as 3-methyl-3-penten-1-yne and 3,5-dimethyl-3-hexen-1-yne; cycloalkenylsiloxanes, such as 1,3,5,7-tetramethyl -1,3,5,7-tetravinylcyclotetrasiloxane and 1,3,5, 7-tetramethyl -1,3,5,7-tetrahexenylcyclotetrasiloxane; and triazole compounds such as benzotriazole. The amount of such addition reaction inhibiting agents added to the composition may be appropriately adjusted in accordance with the desired curing time of the silicone bonding agent of the present invention. However, from the standpoint of avoiding any deterioration in the physical properties of the resulting cured product, it is desirable that said amount be in the range of 0.001 to 5 parts by weight per 100 parts by weight of component (A).

Furthermore, the abovementioned inorganic fillers are components that are used in order to improve the physical characteristics of the cured product that is obtained by curing the silicone bonding agent of the present invention. Examples of such fillers include inorganic fillers such as finely powdered dry-process silica, finely powdered wet-process silica, finely powdered quartz, finely powdered calcium carbonate, finely powdered titanium dioxide, finely powdered diatomaceous earth, finely powdered aluminum oxide, finely powdered aluminum hydroxide, finely powdered zinc oxide or finely powdered zinc carbonate, etc., and inorganic fillers prepared by surface-treating the abovementioned inorganic fillers with organoalkoxysilanes such as methyltrimethoxysilane, etc., organohalosilanes such as trimethylchlorosilane, etc., organosilanes such as hexamethyldisilazane, etc., or siloxane oligomers such as hydroxy-terminated dimethylsiloxane oligomers, hydroxy-terminated methylphenylsiloxane oligomers, or hydroxy-terminated methylvinylsiloxane oligomers.

It is desirable that the abovementioned silicone composition which is suitable for use in the silicone bonding agent of the present invention be stored as a two-liquid type composition consisting of a composition (I) which comprises the abovementioned components (C) and (D) and which does not contain the abovementioned components (a) and (B), and a composition (II) which comprises the abovementioned components (a) and (B) and which does not contain the abovementioned components (C) and (D). The abovementioned component (b) may be contained in either composition (I) or (II). Although the composition of the present invention may also be stored as a single-liquid type composition, the storage stability of the composition of the present invention is better when said composition is stored as a two-liquid type composition as described above. Furthermore, problems such as a drop in curability and adhesive properties during storage, etc., can be avoided.

By allowing the abovementioned silicone bonding agent of the present invention to stand at room temperature, or by heating said bonding agent, it is possible to cure said bonding agent by means of an addition reaction and a condensation reaction, and thus to manufacture an optical memory element which is formed by bonding together a substrate which has a recording layer on one side and a substrate which may or may not have a recording layer on one side. The configuration of the cured product of this bonding agent may be a gel-form configuration, a rubber-form configuration or a resin-form configuration, etc. A rubber-form configuration is especially desirable, since such a configuration makes it possible to maintain good adhesion even when the abovementioned optical memory element is subjected to shock or vibration.

Next, the optical memory element of the present invention will be described.

The optical memory element of the present invention is an optical disk or optical card such as a video disk, compact disk, read-only type disk memory or rewritable disk memory, etc. This optical memory element is characterized by the fact that a substrate A which has a recording layer on one side, and a substrate A' which may or may not have a recording layer on one side, are bonded together by means of a silicone bonding agent B.

In the optical memory element of the present invention, the silicone bonding agent B which is used to bond together the aforementioned substrates A and A' is characterized by the fact that said bonding agent comprising a silicone composition which is cured by an addition reaction and a condensation reaction. It is desirable that this silicone composition be a silicone composition of the type described above.

Finally, the method of the present invention for manufacturing an optical memory element will be described in detail.

The method of the present invention for manufacturing an optical memory element is characterized by the fact that a substrate which has a recording layer on one side and a substrate which may or may not have a recording layer on one side are bonded together via a silicone bonding agent comprising a silicone composition which is cured by an addition reaction and a condensation reaction. Examples of methods which can be used to apply the abovementioned silicone bonding agent to said substrates include brush coating, spray coating, spin coating, calendering and knife coating. From the standpoint of achieving efficient bonding of the substrates, it is desirable that the thickness of the coating of the abovementioned silicone bonding agent that is applied to the abovementioned substrates be from 1 to 1,000 microns.

The method of the present invention for manufacturing an optical memory element is characterized by the fact that the silicone bonding agent which is used to bond together the abovementioned substrates consists of a silicone composition which is cured by an addition reaction and a condensation reaction. It is desirable that this silicone composition be a silicone composition of the type described above.

In regard to the conditions which are used to cure the abovementioned silicone type bonding agent in the manufacturing method of the present invention, heating the bonding agent to a high temperature results in the generation of thermal stress in the substrates; accordingly, it is desirable that the bonding agent be cured at a temperature ranging from room temperature to 50° C.

EXAMPLES

The silicone type optical memory element bonding agent, optical memory element and optical memory element manufacturing method of the present invention will be described below in detail in terms of practical examples of application. In these practical example, all viscosity values are values measured at 25° C.

Practical Example 1

10 parts by weight of dry-process silica with a BET specific surface area of 200 $m^2/g$ which had been surface-treated with hexamethyldisilazane was uniformly mixed with 100 parts by weight of a trimethoxysiloxy-terminated dimethylpolysiloxane (viscosity: 25,000 centipoise (mPa.s.), used as component (A)(a)). Afterward, 1 part by weight of methyltrimethoxysilane and 1 part by weight of a trimethylsiloxy-terminated dimethylsiloxane-methylhydrogensiloxane copolymer (content of silicon-bonded hydrogen atoms=0.75 wt %, viscosity: 5 centipoise (mPa.s.), used as component (B)) were added and uniformly mixed, thus producing composition (I).

Meanwhile, 10 parts by weight of dry-process silica with a BET specific surface area of 200 $m^2/g$ which had been surface-treated with hexamethyldisilazane was uniformly mixed with 100 parts by weight of a dimethylvinylsiloxy-terminated dimethylpolysiloxane (content of silicon-bonded vinyl groups=0.14 wt %, viscosity: 10,000 centipoise (mPa.s.), used as component (A)(b)). Afterward, 0.5 parts by weight of diisopropoxy-bis(ethylacetoacetate)titanium (used as component (C)) and an isopropyl alcohol solution of chloroplatinic acid (in which the amount of chloroplatinic acid added was adjusted so that the amount of platinum metal was 50 ppm in weight units relative to the abovementioned dimethylpolysiloxane; this was used as component (D)) were added and uniformly mixed, thus producing composition (II).

The total amount of the abovementioned composition (I) and the total amount of the abovementioned composition (II) were mixed, thus producing a silicone type optical memory element bonding agent (in this case, the molar ratio of the silicon-bonded hydrogen atoms in component (B) to the silicon-bonded vinyl groups in component (A) was 1.4). An optical memory element was manufactured using this silicone bonding agent. Specifically, said silicone bonding agent was applied to a thickness of 100 microns on the reflective film layer side of a substrate A. Next, the reflective film layer side of another substrate A', was caused to adhere tightly to the abovementioned silicone bonding agent, and the substrates were pressed together for 15 minutes at room temperature by means of a press, thus producing an optical memory element. An attempt was made to peel the substrates of this optical memory element apart; however, the silicone bonding agent was completely cured, and when forcible peeling of the substrates was attempted, the cured portion of the silicone type optical memory element bonding agent showed cohesive failure.

Practical Example 2

10 parts by weight of dry-process silica with a BET specific surface area of 200 $m^2/g$ which had been surface-treated with hexamethyldisilazane was uniformly mixed with 50 parts by weight of a trimethoxyysiloxy-terminated dimethylpolysiloxane (viscosity: 25,000 centipoise mPa.s.), used as component (A)(a)) and 50 parts by weight of an organopolysiloxane mixture consisting of 25 parts by weight of an organopolysiloxane copolymer containing $SiO_{4/2}$ units, $(CH_3)_3SiO_{1/2}$ units and $(CH_3)_2$ $(CH_2=CH)$ $SiO_{1/2}$ units and 25 by weight of a dimethylvinylsiloxy-terminated dimethylpolysiloxane (viscosity: 8,000 centipoise (mPa.s.), content of silicon-bonded vinyl groups=0.8 wt %, used as component (A)(b)). Afterward, 6 parts by weight of a trimethylsiloxy-terminated dimethylsiloxane-methylhydrogensiloxane copolymer (viscosity: 5 centipoise (mPa.s.), content of silicon-bonded hydrogen atoms=0.75 wt %, used as component (B)), 0.25 parts by weight of zirconium tetraacetylacetonate dissolved in toluene (used as component (C)) and an isopropyl alcohol solution of chloroplatinic acid (in which the amount of chloroplatinic acid added was adjusted so that the amount of platinum metal was 50 ppm in weight units relative to the total of the abovementioned dimethylpolysiloxane and; this was used as component (D)) were added and uniformly mixed, thus producing a silicone bonding agent (in this case, the molar ratio of the silicon-bonded hydrogen atoms in component (B) to the silicon-bonded vinyl groups in component (A) was 3.0).

An optical memory element was manufactured using the abovementioned silicone bonding agent. Specifically, the abovementioned silicone bonding agent was applied at a thickness of 50 microns on the reflective film layer side of a substrate A. Next, the reflective film layer side of another substrate A' was caused to adhere tightly to the abovementioned silicone bonding agent, and the substrates were pressed together for 2 hours at room temperature by means of a press, thus producing an optical memory element.

An adhesion test specimen with a length of 3.5 cm and a width of 2 cm was cut from this optical memory element, and the tensile shear adhesive strength of said specimen was measured by the tensile shear adhesion test method stipulated in JIS K 6850. As a result, a value of 7 $kgf/cm^2$ was obtained. Furthermore, when the test specimen was examined following testing, it was found that the cured silicone type optical memory element bonding agent showed good adhesion to the substrates, and that this cured product had undergone cohesive failure.

Comparative Example 1

10 parts by weight of dry-process silica with a BET specific surface area of 200 $m^2/g$ which had been surface-treated with hexamethyldisilazane was uniformly mixed with 100 parts by weight of a dimethylhydroxysiloxy-terminated dimethylpolysiloxane (viscosity: 12,000 centipoise (mPa.s.)), thus producing composition (III). Furthermore, 2 parts by weight of tetraethoxysilane and 0.5 parts by weight of dibutyltin dilaurate were uniformly mixed to produce composition (IV). Next, the total amount of composition (III) and the total amount of composition (IV) were uniformly mixed, thus producing a silicone bonding agent.

Using the abovementioned silicone bonding agent, an optical memory element was manufactured in the same manner as in Practical Example 1. When an attempt was made to peel apart the substrates of this optical memory element, it was found that the abovementioned silicone bonding agent was not completely cured. As a result, the substrates were easily peeled apart.

Furthermore, an optical memory element was also manufactured in the same manner as in Practical Example 2 using the abovementioned silicone bonding agent. When an adhesion test specimen was cut out from this optical memory element in the same manner as in Practical Example 2, and the tensile shear adhesive strength was measured, a value of 0.8 kgf/cm$^2$ was obtained. Furthermore, when the test specimen was examined following testing, it was found that the cured silicone type optical memory element bonding agent had peeled completely away from the substrates.

Comparative Example 2

10 parts by weight of dry-process silica with a BET specific surface area of 200 m$^2$/g which had been surface-treated with hexamethyldisilazane was uniformly mixed with 100 parts by weight of a trimethoxysiloxy-terminated dimethylpolysiloxane (viscosity: 25,000 centipoise (mPa.s.)). Afterward, 2 parts by weight of methyltrimethoxysilane and 0.5 parts by weight of diisopropoxy-bis (ethylacetoacetato) titanium were added and uniformly mixed, thus producing a silicone bonding agent.

Using the abovementioned silicone type optical memory element bonding agent, an optical memory element was manufactured in the same manner as in Practical Example 1. When an attempt was made to peel apart the substrates of this optical memory element, it was found that the abovementioned silicone bonding agent was not cured at all. As a result, the substrates were easily peeled apart.

Comparative Example 3

10 parts by weight of dry-process silica with a BET specific surface area of 200 m$^2$/g which had been surface-treated with hexamethyldisilazane was uniformly mixed with 100 parts by weight of a dimethylvinylsiloxy-terminated dimethylpolysiloxane (viscosity: 10,000 centipoise (mPa.s.)). Afterward, an isopropyl alcohol solution of chloroplatinic acid (in which the amount of chloroplatinic acid added was adjusted so that the amount of platinum metal was 50 ppm in weight units relative to the abovementioned dimethylpolysiloxane) was added and uniformly mixed, thus producing composition (V).

Furthermore, 10 parts by weight of dry-process silica with a BET specific surface area of 200 m$^2$/g which had been surface-treated with hexamethyldisilazane was similarly uniformly mixed with 100 parts by weight of a dimethylvinylsiloxy-terminated dimethylpolysiloxane (viscosity: 10,000 centipoise (mPa.s.)), after which 2 parts by weight of a trimethylsiloxy-terminated dimethylsiloxane-methylhydrogensiloxane copolymer (viscosity: 5 centipoise (mPa.s.); in this copolymer, the molar ratio of dimethylsiloxane units to methylhydrogensiloxane units was 3:5) was added and uniformly mixed, thus producing composition (VI).

The total amount of the abovementioned composition (V) and the total amount of the abovementioned composition (VI) were mixed, thus producing a silicone bonding agent. Using this silicone bonding agent, an optical memory element was manufactured in the same manner as in Practical Example 1. When an attempt was made to peel apart the substrates of this optical memory element, it was found that although the abovementioned silicone bonding agent was completely cured, said bonding agent showed complete peeling from the substrates.

Furthermore, an optical memory element was also manufactured in the same manner as in Practical Example 2 using the abovementioned silicone bonding agent. When an adhesion test specimen was cut out from this optical memory element in the same manner as in Practical Example 2, and the tensile shear adhesive strength was measured, a value of 1.6 kgf/cm$^2$ was obtained. Furthermore, when the test specimen was examined following testing, it was found that the cured silicone bonding agent had peeled completely away from the substrates.

The silicone type optical memory element bonding agent of the present invention is characterized by the fact that said bonding agent can be quickly cured by an addition reaction and a condensation reaction, and makes it possible to bond together in a favorable manner a substrate which has a recording layer on one side and a substrate which may or may not have a recording layer on one side. Furthermore, the optical memory element of the present invention is characterized by the fact that the abovementioned substrates are bonded together in a favorable manner. Moreover, the method of the present invention for manufacturing an optical memory element is characterized by the fact that an optical memory element of the abovementioned type can be efficiently manufactured.

That which is claimed is:

1. A silicone composition curable to a silicone bonding agent that is suitable for use in manufacturing an optical memory element, comprising
   (A) 100 parts by weight of an organopolysiloxane having an average of at least two silicon-bonded alkoxy groups per molecule and an average of at least two silicon-bonded alkenyl groups per molecule, wherein the alkoxy groups and the alkenyl groups are in the same molecule;
   (B) an organohydrogenpolysiloxane having an average of at least two silicon-bonded hydrogen atoms per molecule, wherein the molar ratio of silicon-bonded hydrogen atoms in component (B) to silicon-bonded alkenyl groups in component (A) is from 0.3:1 to 20:1;
   (C) 0.01 to 20 parts by weight of a metal condensation reaction catalyst wherein the metal of said metal condensation reaction catalyst is selected from the group consisting of titanium, zirconium and aluminum; and
   (D) a catalytic amount of a hydrosilylation reaction catalyst.

2. A product from incipient materials:
   (A) 100 parts by weight of an organopolysiloxane having an average of at least two silicon-bonded alkoxy groups per molecule and an average of at least two silicon-bonded alkenyl groups per molecule, wherein the alkoxy groups and the alkenyl groups are in the same molecule;
   (B) an organohydrogenpolysiloxane having an average of at least two silicon-bonded hydrogen atoms per molecule, wherein the molar ratio of silicon-bonded hydrogen atoms in component (B) to silicon-bonded alkenyl groups in component (A) is from 0.3:1 to 20:1;

(C) 0.01 to 20 parts by weight of a metal condensation reaction catalyst wherein the metal of said metal condensation reaction catalyst is selected from the group consisting of titanium, zirconium and aluminum; and (D) a catalytic amount of a hydrosilylation reaction catalyst.

3. The silicone composition of claim 1, wherein (A) the organopolysiloxane is selected from the group consisting of vinyldimethoxysiloxy-terminated dimethylpolysiloxanes, trimethoxysiloxy-terminated dimethylsiloxane-methylvinylsiloxane copolymers, and methyldimethoxysiloxy-terminated dimethylsiloxane-methylvinylsiloxane copolymers.

4. The silicone composition of claim 1, wherein the hydrosilylation reaction catalyst is selected from the group consisting of platinum type catalysts, rhodium type catalysts, palladium type catalysts, fine particles of thermoplastic resins containing platinum type catalysts, fine particles of thermoplastic resins containing rhodium type catalysts, and fine particles of thermoplastic resins containing palladium type catalysts, and mixtures of two or more of these hydrosilylation reaction catalysts.

5. The silicone composition of claim 1, further comprising an agent selected from the group consisting of alkoxysilanes, partially hydrolyzed condensates of alkoxysilanes, inorganic fillers, addition reaction inhibiting agents, non-reactive organopolysiloxanes, organic solvents, flame retarding agents, heat resistance enhancing agents, plasticizers, thixotropic agents, adhesion promoting agents, and anti-mildew agents.

6. The silicone composition of claim 5, further comprising an alkoxysilane having a formula $R^3_a Si(OR^4)_{(4-a)}$, wherein $R^3$ is selected from the group consisting of monovalent hydrocarbon groups, epoxy-functional organic groups, and acrylic-functional organic groups, $R^4$ is selected from the group consisting of alkyl groups and alkoxyalkyl groups, and a is 0, 1, or 2.

7. The silicone composition of claim 6 wherein the epoxy-functional organic groups are selected from the group consisting of oxiranylalkyl groups, glycidoxyalkyl groups, and 2-(3,4-epoxycyclohexyl)-vinyl groups.

8. The silicone composition of claim 7, wherein the acrylic-functional organic groups are selected from the group consisting of 3-acryloxypropyl, 3-methacryloxypropyl, and 4-methacryloxybutyl groups.

* * * * *